United States Patent
Kaagman et al.

(10) Patent No.: US 7,694,709 B2
(45) Date of Patent: Apr. 13, 2010

(54) TREAD APPLICATION DEVICE

(75) Inventors: Mattheus Jacobus Kaagman, Apeldoorn (NL); Franciscus Johannes Wilhelmus Kooiman, Hengelo (NL)

(73) Assignee: VMI Epe Holland B.V., RK Epe (NL)

( * ) Notice: Subject to any disclaimer, the term of this patent is extended or adjusted under 35 U.S.C. 154(b) by 980 days.

(21) Appl. No.: 10/565,174

(22) PCT Filed: Jul. 23, 2004

(86) PCT No.: PCT/NL2004/000531

§ 371 (c)(1),
(2), (4) Date: Jun. 7, 2006

(87) PCT Pub. No.: WO2005/009726

PCT Pub. Date: Feb. 3, 2005

(65) Prior Publication Data

US 2007/0003649 A1    Jan. 4, 2007

(30) Foreign Application Priority Data

Jul. 28, 2003    (NL) .................................... 1024009

(51) Int. Cl.
*B29D 30/30* (2006.01)
*B29D 30/58* (2006.01)
*B65H 23/02* (2006.01)

(52) U.S. Cl. .................... 156/360; 156/130; 156/405.1; 156/406.4

(58) Field of Classification Search .................. 156/123, 156/130, 405.1, 406.4, 360; 198/606, 415, 198/817
See application file for complete search history.

(56) References Cited

U.S. PATENT DOCUMENTS 2,850,277 A    9/1958    Clark (Continued)

FOREIGN PATENT DOCUMENTS

EP    0 844 067    5/1998

(Continued)

OTHER PUBLICATIONS

Machine translation of JP-08-058958-A, Mar. 5, 1996.*

*Primary Examiner*—Geoffrey L Knable
(74) *Attorney, Agent, or Firm*—Ladas & Parry LLP (57) ABSTRACT

The invention relates to a tread (1) application device for applying a tread on a building drum (20) for a tire, comprising a tread conveying device (15) for conveying a tread to a building drum, from a feed side (12) of the tread conveying device to a discharge side (13) of the tread conveying device in a conveyance direction, and a positioning device for positioning the tread on the building drum, wherein the positioning device comprises measuring means (17) for determining the position of a segment of the tread and generating a position value, displacement means for displacing a segment of the tread with a displacement directional component parallel to the axis (21) of rotation of the building drum, and control means (28), connected to the measuring means and the displacement means, for on the basis of the position value controlling the displacement device during the application of the tread on the building drum.

7 Claims, 10 Drawing Sheets

U.S. PATENT DOCUMENTS

| | | | |
|---|---|---|---|
| 4,049,486 A | 9/1977 | Henley | |
| 4,359,675 A | 11/1982 | Miller, III | |
| 4,386,273 A | 5/1983 | Jones | |
| 4,807,739 A * | 2/1989 | Wolf et al. | 198/415 |
| 5,546,330 A | 8/1996 | Sergel et al. | |
| 5,582,664 A * | 12/1996 | Sergel et al. | 156/64 |
| 5,725,703 A | 3/1998 | Gerloff | |
| 6,062,453 A | 5/2000 | Murray et al. | |
| 6,126,383 A * | 10/2000 | Franklin et al. | 198/374 |
| 6,547,906 B1 * | 4/2003 | Kölker et al. | 156/123 |
| 2003/0019725 A1 * | 1/2003 | Hoffmann | 198/571 |
| 2003/0066610 A1 | 4/2003 | Kolker et al. | |

FOREIGN PATENT DOCUMENTS

| | | | |
|---|---|---|---|
| GB | 954976 | | 4/1964 |
| GB | 973972 | | 11/1964 |
| GB | 1 254 391 | | 11/1971 |
| JP | 5-229032 | | 9/1993 |
| JP | 06-336328 A | * | 12/1994 |
| JP | 8-58958 | | 3/1996 |
| WO | 99/42390 | | 8/1999 |

* cited by examiner

TREAD APPLICATION DEVICE

The invention relates to a device for conveying strip-shaped material, such as a tread.

Such devices are known from US-B1-6.488.193, U.S. Pat. No. 6,062,453, US-A1-2003/0066610, EP-A2-844.067, U.S. Pat. No. 4,359,675. In all these devices the shape or position of the strip-shaped material is measured above a measuring slit, created by interrupting a conveying device, or measured at the end of the conveying device. Correction of the position takes place by lateral displacement of the strip itself or the device on which the strip is situated, near the measuring slit. This may result in inaccuracies in the measurements because the measuring range and the correction range are close together or even overlap each other. In addition high demands are made on the measuring speed and correction speed, and complicated correction calculations cannot be made or with a lot of difficulties. Including measuring results from the past is difficult if not impossible.

Moreover due to the necessary measuring slit the strip is not supported over its full length, which may entail stretch or measuring errors.

It is an object of the invention to offer an alternative, or at least to offer an improvement of the existing devices.

To that end the invention regards a device for conveying strip-shaped material, such as a tread, from a feed side to a discharge side, comprising a main conveyor belt extending from the feed side to the discharge side, and auxiliary conveyor belts on both sides of the main conveyor belt and which each comprise a feed conveyor belt and a discharge conveyor belt, and a slit-shaped opening between the feed conveyor belt and the discharge conveyor belt, positioned for on both sides of the main conveyor belt forming a slit.

As a result a strip is supported over its full length, and a more accurate recording can be made of the width of the strip and the position of the strip on the device.

In an embodiment of the device according to the invention the slit-shaped openings of the auxiliary conveyor belts extend in line. The position or width can thus easily be determined.

In an embodiment the main conveyor belt is adapted for over its full length supporting a strip.

In an embodiment the main conveyor belt comprises retaining means for retaining the strip-shaped material on the main conveyor belt.

In an embodiment the retaining means are adapted for retaining the strip on the main conveyor belt over almost its full surface supported on the main conveyor belt.

In an embodiment the main conveyor belt is smooth for retaining an unvulcanised rubber strip on the main conveyor belt almost fixed in place.

In an embodiment the auxiliary conveyor belts are smooth for retaining an unvulcanised rubber strip on the auxiliary conveyor belts almost fixed in place In an embodiment the device according to the invention further comprises a recorder, preferably an image recorder, such as a camera or line scan camera, above or below the slit. In an embodiment of this device, a lighting unit, such as a fluorescent lighting or a stroboscopic lighting, is disposed opposite the recorder at the other side of the slit. In an embodiment of this device it is further provided with a control unit, operationally connected to the recorder, memory means for storing an image of a complete strip of strip-shaped material, and calculation means for calculating the strip position on the device based on the recordings of the recorder.

In an embodiment of the device according to the invention it is furthermore provided with means for laterally moving the discharge side while conveying a strip.

In an embodiment of the device according to the invention it is furthermore provided with an axis of rotation at the feed side or the slit, and the means for laterally moving the discharge side while conveying a strip have the device rotate about the axis of rotation.

In an embodiment of this device provided with a control device, the control device is operationally connected to the means for lateral movement, and to driving means for the main conveyor belt for thus knowing the position of the strip on the main conveyor belt in the longitudinal direction, and the control means comprise reference positions for the strip on the device, wherein the control device is adapted for during conveyance of the strip controlling the means for lateral displacement.

In an embodiment of the device according to the invention, the feed conveyor belts are shorter than the discharge conveyor belts, preferably shorter to such an extent that the slit is near the feed side.

In an embodiment the conveyor belts are so-called timing belts, provided with a servo-drive.

In an embodiment the device is provided with driving means at the feed side for the common driving of the main conveyor belt and feed conveyor belts. In a further embodiment thereof the main conveyor belt and the discharge conveyor belts at the discharge side comprise a common driving roller or guiding roller.

The above device is preferably used in assemblies or machines for building tyres. Several strips of unvulcanised rubber, such as belt layers, airtight inner layers and treads are processed and conveyed to a building drum. The strips then have to be arranged around the building drum accurate as to position. The device is particularly suitable as application device for applying components on a building drum. Especially treads are difficult to apply, because they are thin, yet have flaring sides, the development moreover being that the angle becomes ever more slight. The edges may therefore easily get damaged.

The invention further relates to a tread application device for applying a tread on a building drum for a tyre, and a method for applying a tread on a building drum for a tyre.

It is common practice to apply several layers for a tyre, such as a car tyre or lorry tyre, on a building drum. Various layers, such as for instance the inner layer ensuring the airtightness, the side wall compound, the beads and other layers are built together on a carcass building drum. On a belt-tread building drum, often simultaneously, a package is built up consisting of belt layers having the tread as finishing over them. The tread (when compared to the layers already arranged) is a relatively thick strip of unvulcanised, sticky rubber, usually approximately one to several centimeters thick, approximately 10-40 cm wide and approximately one to several meters long. The belt layer tread package is subsequently transferred to the carcass building drum. This is among other things described in applicant's European patent EP-B1-88436.

Applying a tread is a problem, particularly the proper positioning on the building drum. Up until today adjustments and corrections by an operator are often necessary. A positioning that is more accurate than approximately one millimeter is desirable.

Both U.S. Pat. No. 4,049,486 and EP-A2-844.067 describe a centring device for "band-shaped" material. A mechanic side guiding is used here that is unsuitable for directing treads, particularly not the current treads that become ever thinner, have been provided with asymmetrical grooves and an ever slighter side angle.

U.S. Pat. No. 4,359,675 and U.S. Pat. No. 6,062,453 measure and correct just before applying a strip onto a building drum.

US-B1-6.488.193 corrects the lateral position of a tread based on the rib integrally formed on the tread. Here again measuring and correcting takes place at the same measuring slit, and moreover far from the building drum.

Various solutions, among others those described above, have been come up with using the lateral displaceable conveying devices.

It is an object of the invention to improve the positioning of a tread on a building drum.

To that end the invention furthermore provides a tread application device for applying a tread on a building drum for a tyre, comprising:

a tread conveying device for conveying a tread to a building drum, from a feed side of the tread conveying device to a discharge side of the tread conveying device in a conveyance direction, and a positioning device for positioning the tread on the building drum, wherein the positioning device comprises measuring means at the feed side for determining the position of a segment of the tread and generating a position value, displacement means for displacing the segment of the tread with a displacement directional component parallel to the axis of rotation of the building drum, and control means, connected to the measuring means and the displacement means, for on the basis of the position value controlling the displacement device during the application of the segment of the tread on the building drum.

The invention further relates to a method for applying a tread on a building drum for a tyre, wherein the position of each segment of the tread on a tread conveying device is measured, after which the tread conveying device conveys the tread to the building drum and applies it on the building drum, wherein during application of the tread on the building drum the position of a segment of the tread that is applied on the building drum is repeatedly adjusted to a pre-set value prior to it being applied on the building drum by laterally displacing the tread conveying device with respect to the building drum.

By repeatedly measuring the position of a segment and if necessary correcting the position of said segment during the application, it turned out to be possible to automate this aspect of building a tyre as well. It turned out that in the known system measuring takes place and immediately subsequent correction through lateral displacement takes place, after which a strip is applied on a building drum.

Furthermore, because a position value is generated and on the basis of said position value the position of the segment is adjusted if so desired, it turned out to be possible to both accurately determine the position value and accurately set the position. Thus it is particularly possible to apply a tread properly centred on a building drum.

Due to a separation of both functions, measuring and positioning, it turned out to be possible to measure a tread highly accurately and reproducibly, and on the basis of the measurement applying it correctly and reproducibly on the building drum.

By carrying out a measurement during the conveyance, and the positioning during application, correct application of the tread can take place quickly. Particularly a properly centred application turned out to be possible.

In an embodiment of the device according to the invention the tread conveying device comprises a main conveyor belt extending from the feed side to the discharge side. The tread can thus be monitored during conveyance.

According to a further embodiment thereof, the tread conveying device comprises auxiliary conveyor belts on both sides of the main conveyor belt.

According to a further embodiment thereof, the auxiliary conveyor belts comprise a feed auxiliary conveyor belt and a discharge auxiliary conveyor belt.

According to yet a further embodiment thereof, the main conveyor belt comprises a feed bearing roller and a discharge bearing roller, wherein the feed bearing roller forms a bearing roller for the feed auxiliary conveyor belts and the discharge bearing roller a bearing roller for the discharge auxiliary conveyor belts. As a result the mutual speed of the conveyor belts can be properly adjusted.

According to another or a further embodiment the feed auxiliary conveyor belts and the discharge auxiliary conveyor belts are disposed with their ends at a mutual distance for forming a slit. Said slit enables the creation of a suitable measuring position.

According to a further embodiment thereof the feed auxiliary conveyor belts and the discharge auxiliary conveyor belts are positioned for on both sides of the main conveyor belt forming a slit, wherein the slits on both sides of the main conveyor belt are in line. Thus, when for instance an image recorder, such as a line scan camera, has been positioned above the slit, and a lighting unit, such as a fluorescent lighting or a stroboscopic lighting, has been positioned below the slit, a recording of a segment having a proper contrast can be made quickly.

According to an embodiment of the device described above, the tread conveying device is positioned mobile for displacing the discharge side with a directional component parallel to the axis of rotation of the building drum.

According to an embodiment thereof the tread conveying device is rotatably positioned about an axis of rotation substantially perpendicular to the displacement direction.

According to a further embodiment thereof the tread conveying device is positioned with the axis of rotation near the feed side for rotating the tread conveying device substantially parallel to a tread to be applied, preferably with the axis of rotation substantially in the middle below a tread to be applied. Thus the positioning can be realised with minimum load and force. Moreover the discharge side of the relatively heavy conveying device can be quickly reciprocally moved, which is necessary for quickly and correctly applying an entire tread. For an efficient production a tread namely has to be applied within a few seconds. In that time usually hundreds of measurements need to have been processed. The displacement device has to be able to make hundreds of adjustment movements within said time.

According to an embodiment of the centring device described above, it comprises an actuator which is connected to the tread conveying device for displacing the discharge side.

An embodiment of the device according to the invention comprises measuring means having an image recorder for recording an image of a segment of a tread on the tread conveying device.

According to an embodiment of this device the measuring means comprise a calculation unit for calculating a middle position value of the segment from a recorded image of a segment.

Means for securing a segment of a tread, preferably a tread over its full surface, on the tread conveying device, may furthermore be included.

In combination with pressing means for retaining a segment of a tread on the building drum, an optimal correction of deviations can be achieved when the tread conveying device and the building drum move laterally with respect to each other.

The securing on the tread conveying device may for instance take place by vacuum means that suck the tread on a conveyor belt, two conveyor belts in between which the tread is conveyed, pressing rollers above the conveyor belt. Preferably, however, the conveyor belt is smooth, as a result of which the tread sticks to the conveyor belt.

For pressing onto the building drum the discharge side of the tread conveying device may be provided with pressing rollers.

In an embodiment the device comprises further measuring means for determining the length of a tread.

In an embodiment thereof the device further comprises means for adapting the length of a tread based on the result of the difference between the length measured and a predetermined set length.

In an embodiment thereof the measuring means comprise at least on image recorder for recording an image of at least a segment of the tread, the control means comprise a computer, the tread conveying device comprises driving means for driving the tread conveying device at an adjustable speed of movement of the tread, and the building drum comprises building drum driving means for driving the building drum at an adjustable speed of circulation, wherein the image recorder, the driving means and the building drum driving means are connected to the computer for exchanging data with the computer, and the computer comprises software for based on images of the image recorder calculating the position and the length of a tread, and based on the calculated length adjusting the mutual operation of the driving means and building drum driving means. An alternative option that it easy to realise, is to let the conveyance speed of the tread conveying device be different from the conveyance speed of the feed device, or to subdivide the tread conveying device into at least two parts having a mutually different conveyance speed.

In another embodiment the predetermined set length is adjusted with reference to the evaluation of the tread in the condition applied on the building drum. When it turns out that for instance in case of visual inspection of the first tread of a series, the splice does not perfectly connect, an operator may adjust the set cutting length or cutting angle in the control means so that the next treads on the building drum do have perfectly connecting cutting faces.

Thus the working of the various components can easily be mutually adjusted. The centring of a segment of the tread can also be determined in this way. From images from the image recorder the longitudinal axis of a tread can be determined. The software compares the longitudinal axis measured to a set longitudinal axis. Based on the differences the computer controls the displacement means.

In another embodiment the predetermined set length is adjusted with reference to the evaluation of the tread in the condition applied on the building drum. When it turns out that for instance in case of visual inspection of the first tread of a series, the splice does not perfectly connect, an operator may adjust the set cutting length or cutting angle in the control means so that the next treads on the building drum do have perfectly connecting cutting faces. The device may optionally be provided with an image recorder for recording an image of the splice on the building drum. The control means are connected to said image recorder and provided with means for evaluating the splice on the building drum on the basis of the recorded image. Preferably means are present in the control means for adjusting the set cutting length or cutting angle based on the results of the aforementioned evaluation.

According to an embodiment of the method according to the invention the middle is repeatedly determined over nearly the full length of the tread from a measurement of the position of both sides of a segment.

According to an embodiment of the method according to the invention, during the application the tread on the building drum, a part of the section of the tread that has not yet been applied on the building drum is displaced with respect to the building drum with a displacement component parallel to the axis of rotation of the building drum.

According to an embodiment of this method, during displacing the part of the tread that has not yet been applied on the building drum, a leading part of the tread is applied on the building drum, and a trailing part of the tread is retained on a tread conveying device.

Various aspects described above can be combined.

The device is further elucidated on the basis of an exemplary embodiment of a tread application device according to the invention, in which.

Figure 1A:
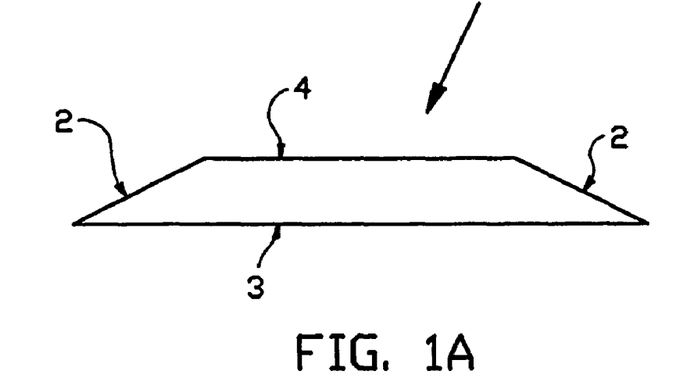
FIG. 1A shows a cross-section of a tread.
Figure 1B:
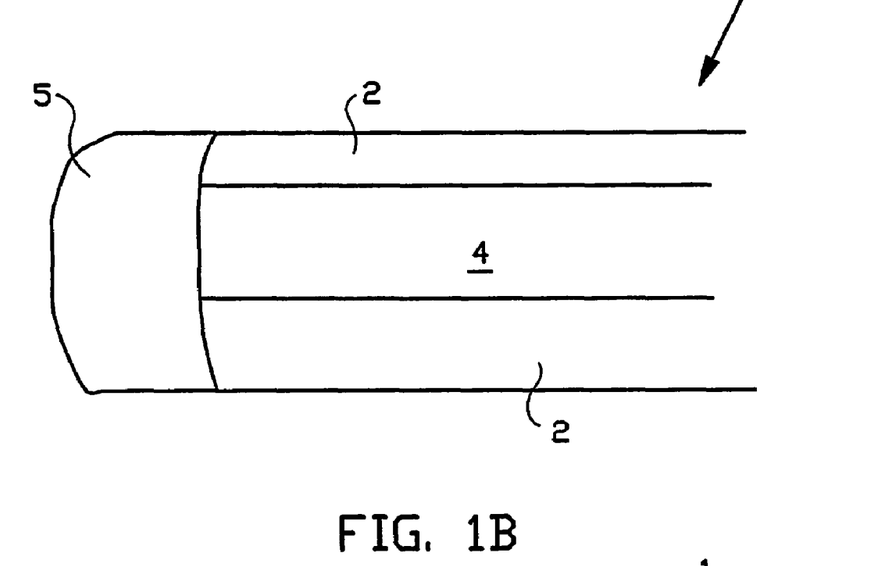
FIG. 1B shows a top view of a tread.

A tread for a tyre is applied as a thick, unvulcanised rubber layer on a package of layers that has already been applied on a building drum. FIG. 1A shows a cross-section of a tread 1. A tread has been provided with slanted edges 2, a lower side of the tread 3 and an upper side 4 of which in the end the profiled part of a tyre will be formed. For the sake of clarity all this is shown again in FIG. 1B in top view. A tread is supplied as a continuous long strip and is subsequently cut into treads by means of diagonal cuts which in FIG. 1B have been indicated with number 5.

Figure 1C:
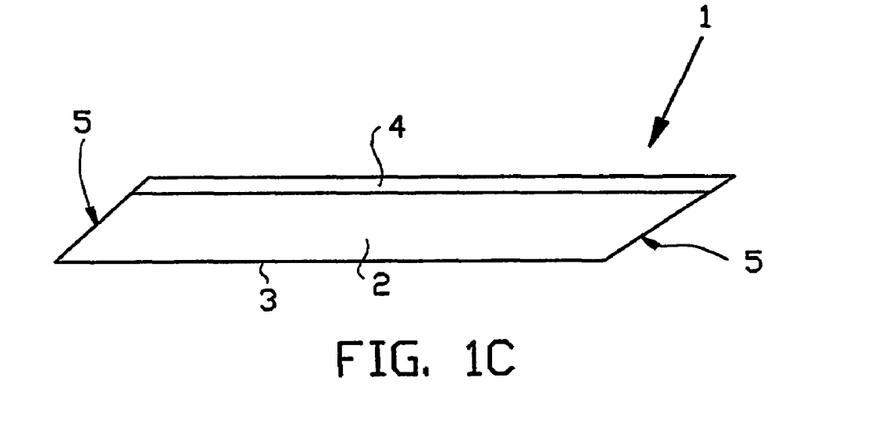
FIG. 1C shows a longitudinal section of a tread.

In the longitudinal section in FIG. 1C it can be seen better that the cut 5 is arranged diagonally so that a large cutting face is created onto which both ends of the tread can finally be glued together so that a continuous band is created. The tread thus forms an endless band.

Figure 2:
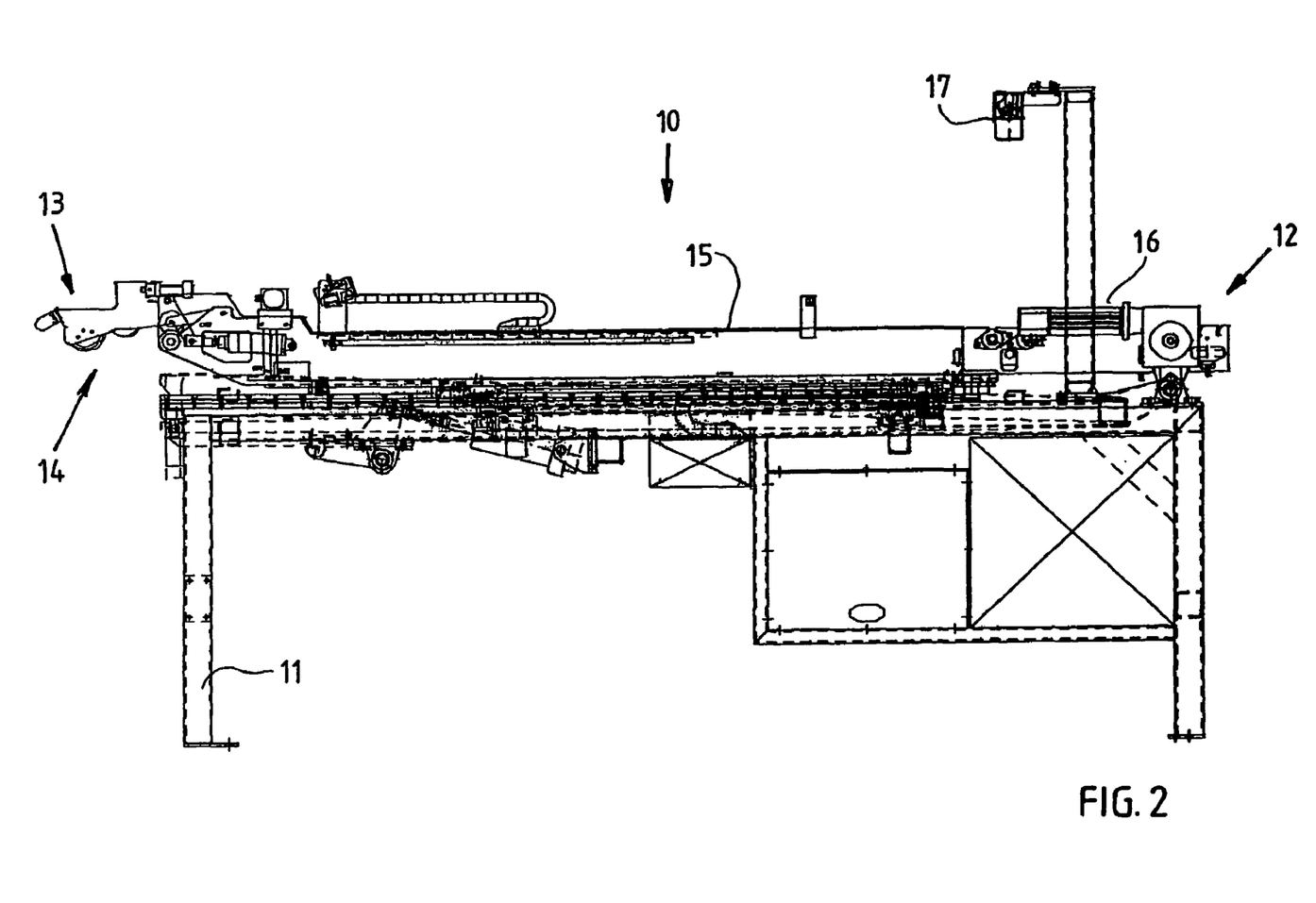
FIG. 2 shows a detailed side view of a tread application device according to the invention.

FIG. 2 shows a detailed side view of the tread application device according to the invention. The tread application device 10 is set on a permanent frame 11 and has a feed side 12 and a discharge side 13. At the discharge side 13 the tread application device is provided with application rollers 14 which for instance have been described in U.S. Pat. No. 6,105,648, which document is included in this text as if fully integrated herein.

The tread application device 10 is provided with a tread conveying device 15 which is mounted movable with respect to the frame 11. For driving the tread conveying device 15, the tread application device 10 is provided with driving means 16, in this case an electromotor. Furthermore the tread application device 10 is provided with measuring means 17 including a camera mounted above the tread conveying device.

Figure 3:
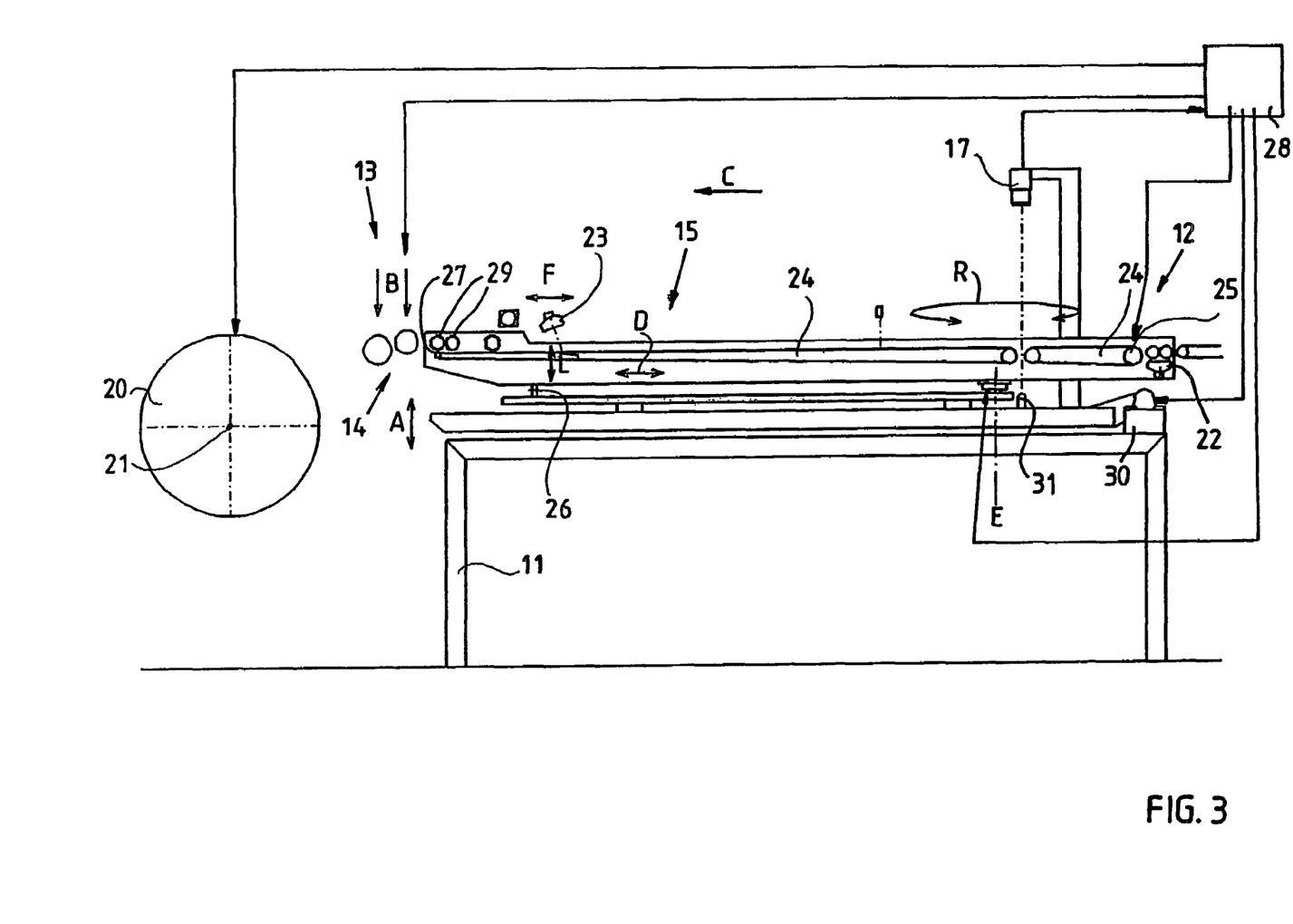
FIG. 3 shows a same side view, schematically in set-up, of the device of FIG. 2 having mobile parts.

FIG. 3 shows a schematic view of the tread application device 10. In this figure the various options of movement of the tread conveying device 15 have been shown. In this figure a building drum 20 has also been shown. On this building drum first of all various layers of the tyre are applied after which finally the tread is applied. The building drum 20 has an axis of rotation 21 about which the building drum can rotate. The tread application device is provided with a first heating device 22 at the feed side 12 of the tread application device and a second heating device 23 near the discharge side 13 of the tread application device. Said second heating device 23 is mobile along the conveying device in the directions F, parallel to the conveyance direction. As a result treads of various lengths can be heated.

Object of the first and second heating device is heating the cutting faces 5. The first heating device 22 therefore heats from the bottom up and the second heating device from the top down. As a result the cutting faces stick together better after application on the building drum. In order to be able to heat the front cutting face for various lengths of treads the second heating device is positioned mobile.

The tread conveying device 15 is provided with various conveyor belts 24 that will be further discussed in the further figures. The conveyor belts 24 are driven by means of a driving roller 25. This will also be explained in detail below. First of all various movement options of the tread conveying device 15 will be described, wherein the directions of movement will be indicated in capital letters.

The tread conveying device can be adjusted as to height about hinge 30 in the direction indicated with A in order to enable adjustment to various building drum diameters.

In addition the pressing rollers 14 are movable in vertical direction in order to be able to press the tread on a building drum 20 and to be able to control the pressure. This direction is indicated with B.

In the tread application device a tread conveying direction C is indicated as the direction in which the treads are being conveyed to the building drum.

In order to bring a tread to a building drum and actually apply it thereon, the tread conveying device is mobile in a direction of movement D, i.e. movable towards the building drum, by means of driving means. The pressing rollers 14 are connected to the tread conveying device and move along towards the building drum 20.

In FIG. 3 lighting unit 31 is also shown straight below image recorder 17. For positioning the tread on the building drum, and continuous adjustment of said position during the application, the tread conveying device is rotatable about an axis of rotation E near the feed side 12 of the tread application device. Near the discharge side 13 of the tread application device the tread conveying device 15 is arranged to that end on little rollers 26, which enable sideward movement of the discharge side of the conveying device. The discharge side of the conveying device is thus movable with a displacement component parallel to the axis of rotation of the building drum.

In FIG. 3 operation means are furthermore shown, in this case a computer 28 provided with a memory and software and connection means for receiving data from the measuring means 17 and transmitting orders and data to the driving unit of the building drum, the driving means for the conveying device, the displacement means for the driving means 30 for displacing the conveying device to the building drum in the direction D.

The conveying device 15 is furthermore provided with pressing rollers 29 for keeping the tread on the conveying device during positioning.

Figure 4:
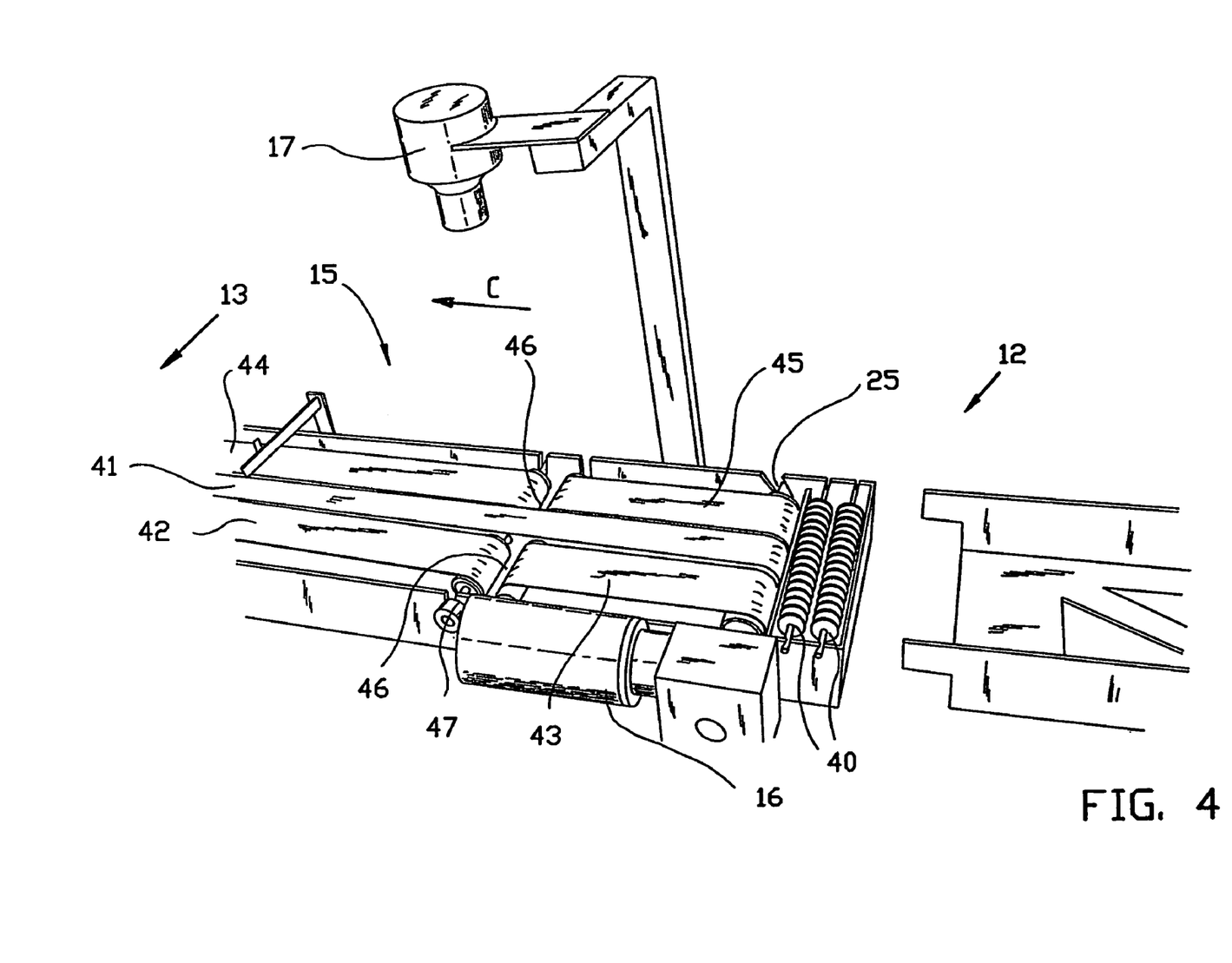
FIG. 4 shows a detailed view of the feed side of the tread application device of FIGS. 2 and 3.

FIG. 4 shows the conveyor belts of the tread conveying device 15 and the position of the camera at the feed side 12 of the tread application device in more detail.

FIG. 4 to that end shows a detailed view of the feed side of the tread application device according to an exemplary embodiment of the invention. A tread or a continuous strip from which the tread is being cut, is supplied at the feed side 12 of the tread application device, where it is passed over the supply rollers 40 underneath which a heating device has been disposed for locally heating the cutting face.

From the supply rollers 40 the tread is subsequently brought onto the conveyor belts, wherein the conveyor belts comprise a main conveyor belt 41 which supports the middle of the tread. Said main conveyor belt runs from the feed side through to the discharge side. The tread conveying device furthermore comprises a first feed auxiliary conveyor belt 43 and a second feed auxiliary conveyor belt 45 on both sides of the main conveyor belt 41, at the feed side. The main conveyor belt and both feed auxiliary conveyor belts on both sides share a common driving roller 25 and driving means 16. Moreover the feed auxiliary conveyor belts 43 and 45 and the discharge auxiliary conveyor belts 42 and 44 are connected to each other by means of toothed belt 47. As a result the speeds of the main conveyor belt and the feed auxiliary conveyor belts and the discharge auxiliary conveyor belts are almost equal.

In addition the tread conveying device 15 comprises a discharge auxiliary conveyor belt 42 and discharge auxiliary conveyor belt 43 both on both sides of the main conveyor belt 41, at the discharge side. The main conveyor belt 41 and both discharge auxiliary conveyor belts share a bearing roller 27 so that the speeds of the main conveyor belt and the discharge auxiliary conveyor belts are equal.

Both discharge auxiliary conveyor belts 42, 44 are positioned at a short distance from both feed auxiliary conveyor belts 43 and 45 so that a measuring slit 46 is created on both sides of the main conveyor belt 41. Underneath the slit 46 a lamp (number 31 in FIG. 3) has been mounted and above the slit 46 a camera 17 has been mounted for making recordings of segments of the tread 1 while the tread is conveyed over the slit 46.

From the images the exact position of each segment of the tread can be determined. In an embodiment both sides of the tread are determined, because the sides yield a high contrast because of the (relatively underexposed) black tread with respect to the slit lighted from below. From the position of both sides the position of the middle of the tread can be determined.

The various conveyor belts 41-45 are provided with a smooth surface so that the lower side of the tread, consisting of sticky unvulcanised rubber, sticks to the conveyor belt and cannot move from it during conveyance of the tread from the feed side to the discharge side and finally to the drum. Moreover hardly any shrinkage may occur as the tread over almost its full length is retained on the conveyor belt. As a result the length can be monitored properly, and a proper distribution of the material can be guaranteed. Moreover the seam of the tread, when applied on the drum, is more constant and more accurate.

Furthermore the length of the conveying device is larger than the length of the treads to be conveyed so that a tread in its entirety can find support on the conveying device.

In the FIGS. 5A-5I the operation of the tread application device is shown in various successive images.

Figure 5A:
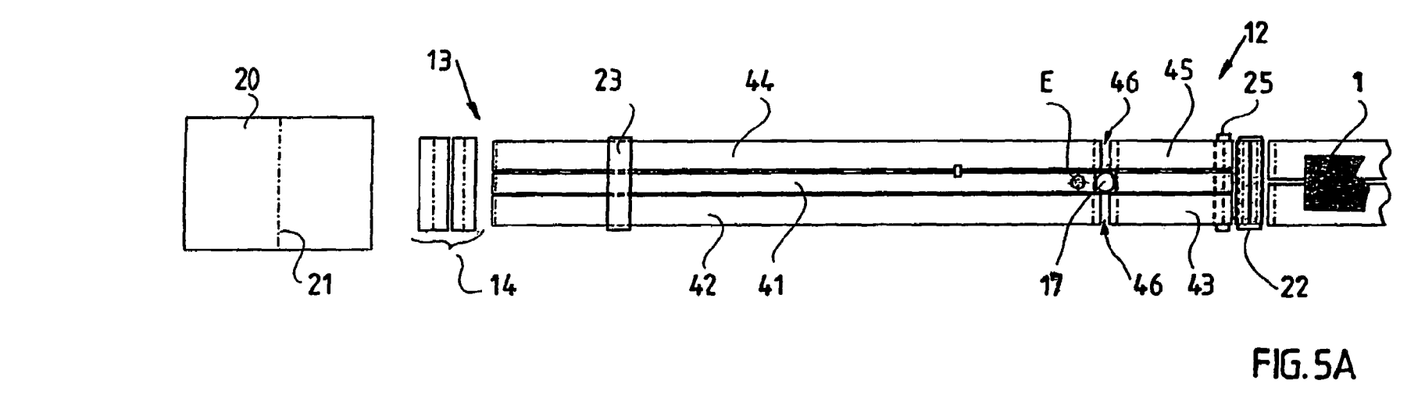
FIGS. 5A-5I show a top view of the tread application device of FIGS. 2-4 during various stages of the application of a tread.

FIG. 5A shows how a tread 1 is supplied by means of a supply device towards the tread application device.

Figure 5B:
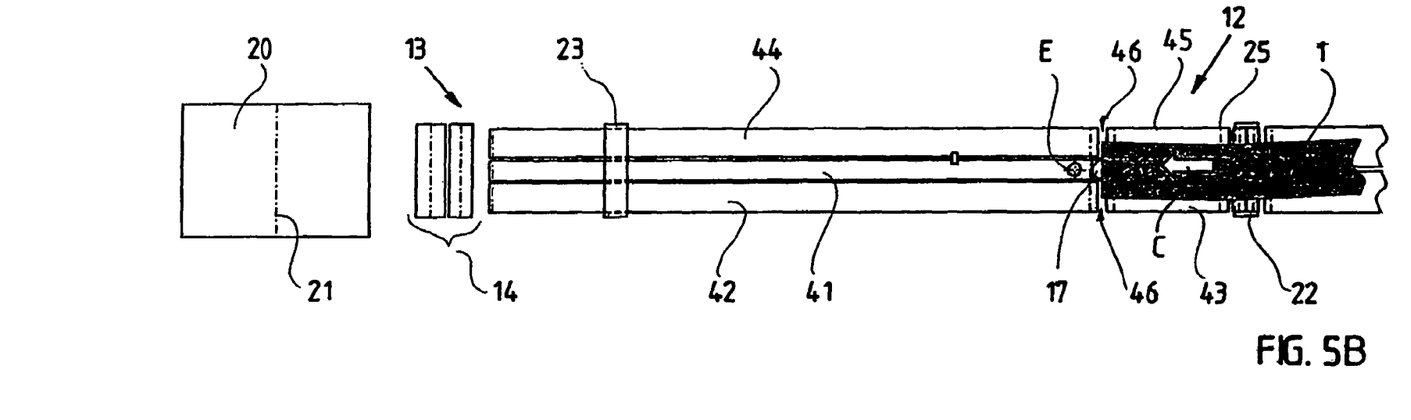

FIG. 5B shows how subsequently the tread has just passed over the slit 46 past the camera 17, so that the beginning of the tread is measured.

Figure 5C:
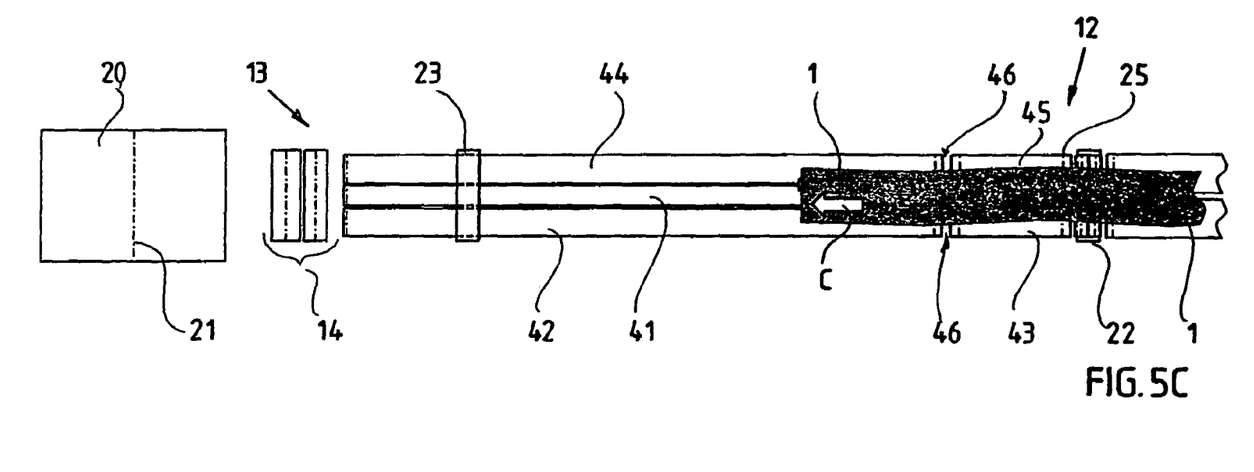

In FIG. 5C it can be seen how the tread is conveyed further over the slit 46 while each time an image recording is made of a next segment. In this figure it can clearly be seen how the shape of the tread can be shifted in the longitudinal direction on the tread application device. The longitudinal axis of the tread is not straight.

Figure 5D:
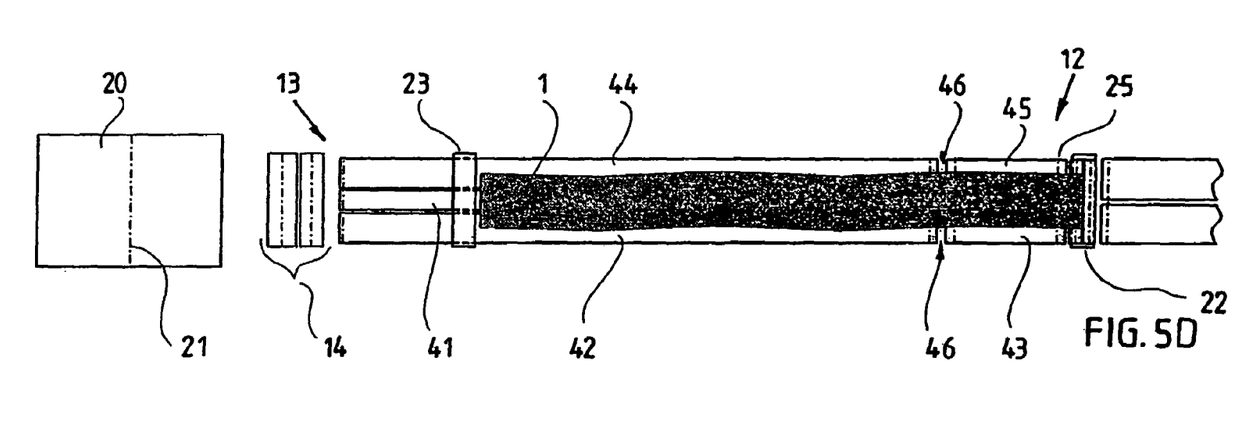

In FIG. 5D it can be seen how the tread 1 faces away from the supply device and is positioned entirely on the conveying device of the tread application device. In this position the heating device 22 is able to properly heat the cutting face. The conveying device will stop a short while for that purpose.

Figure 5E:
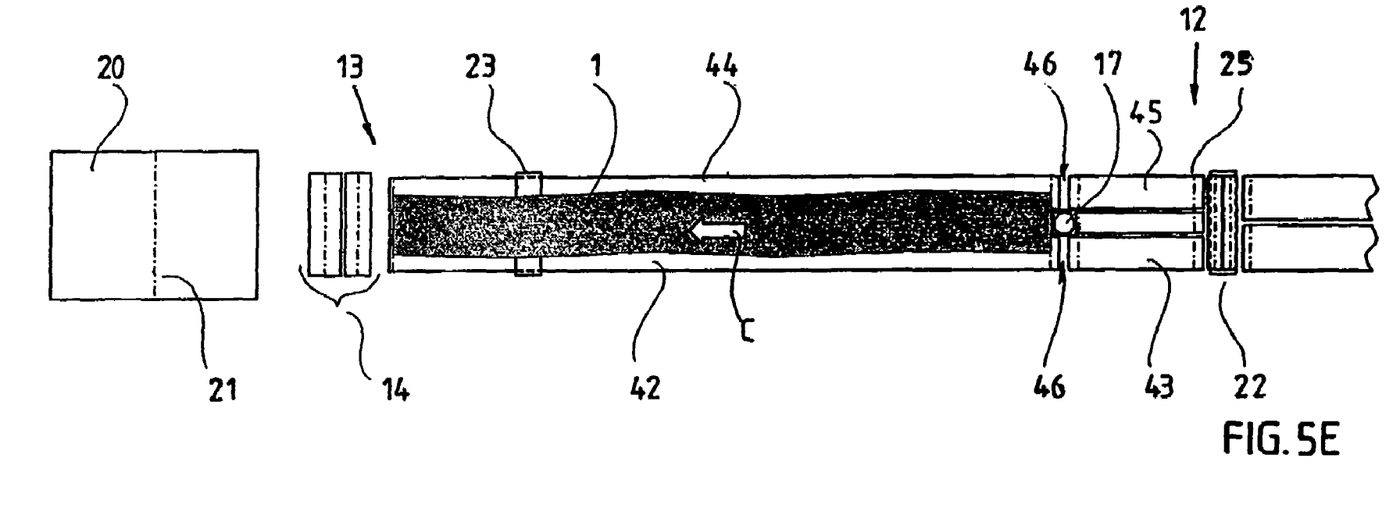

In FIG. 5E the tread has fully passed by the slit 46 and the camera 17 has also recorded an image of the end of the tread. The tread here is positioned entirely on the conveyor belts of the tread conveying device. The measuring device has meanwhile generated a measurement of the position of each segment of the tread 1.

Figure 5F:
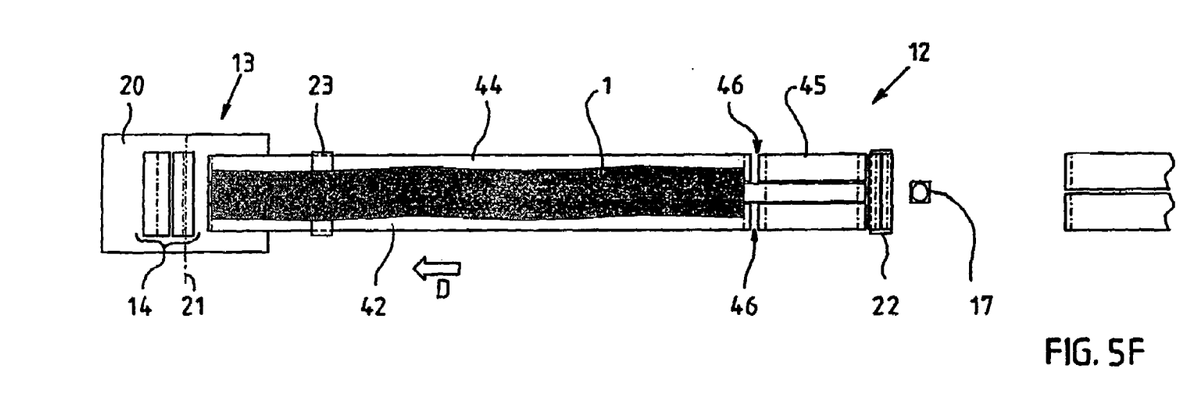

In FIG. 5F it can be seen how the entire tread conveying device is moved towards the building drum, indicated by arrow D. As a result, because the tread is secured onto the smooth surface of the conveyor belts, the tread can hardly move or deform on the conveying device.

Figure 5G:
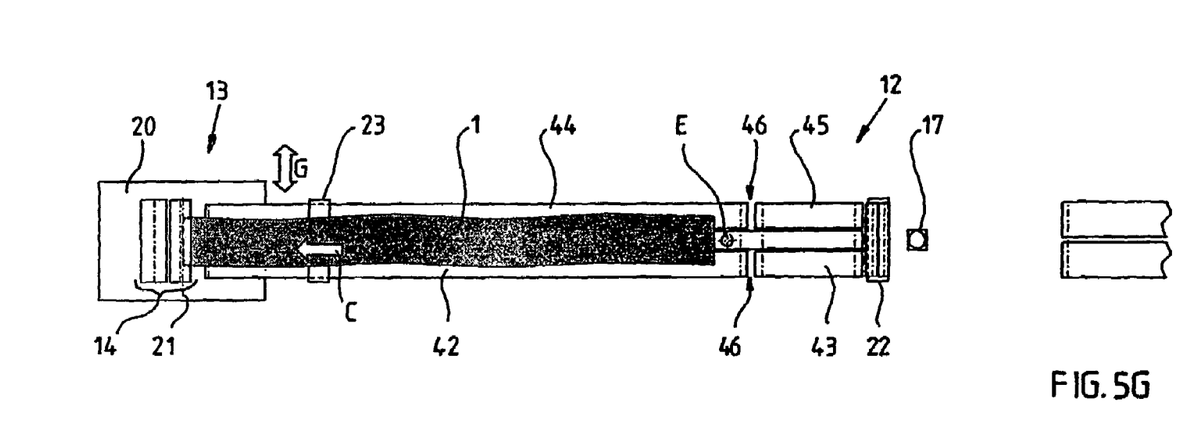

FIG. 5G shows the beginning of applying the tread on the building drum. The pressing rollers 14 press the tread on the drum while the building drum 20 and the conveyor belts of the tread conveying device 15 are now almost synchronously put into motion to wind the tread 1 around the building drum 20. The end of the tread conveying device moves in the direction indicated with arrow G, that means parallel to the axis of rotation 21 of the building drum.

Figure 5H:
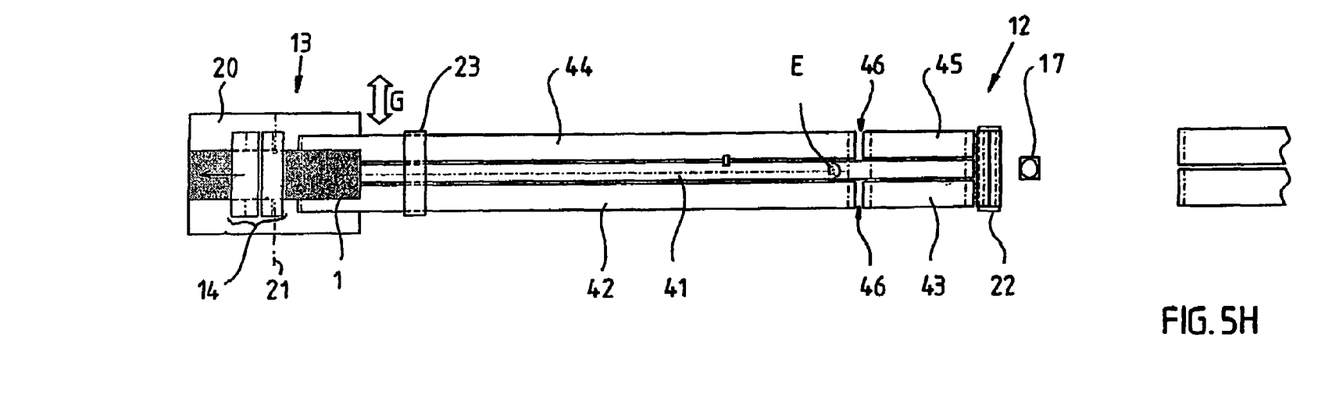

In the FIGS. 5G and 5H it can clearly be seen how the tread conveying device 15 is moved laterally at the feed side 13 in the directions G during the application of the tread in order to be able to correct deviations of each segment. Because one end of the tread 1 is secured on the building drum 20 and the rest of the tread 1 is secured on the tread conveying device 15 it is possible to adjust the position of the segment situated between the building drum 20 and the tread conveying device 15 and which is not retained, so that the tread 1 is applied correctly at the right position on the building drum.

By additionally adjusting the speed of the conveying device and the speed of circulation of the building drum one to the other, moreover the length of the tread can be adjusted, so that slight length deviations that may have been measured can be corrected.

Figure 5I:
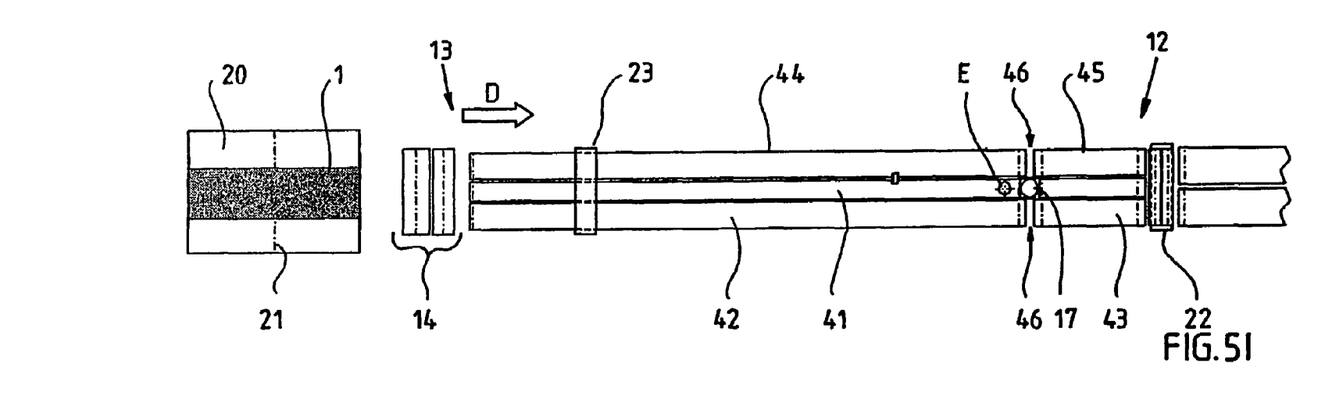

In FIG. 5I it can be seen how the tread 1 has been applied and the tread conveying device 15 is moved back in the direction D to the initial position connecting to the supply device.

Figure 6:
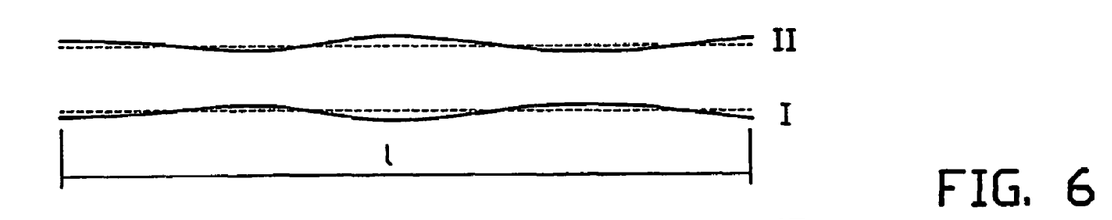
FIG. 6 shows a view of the tread position.

FIGS. 6, 7 and 8 again show the theoretical background of an embodiment of the positioning device according to the invention. From the image recordings that have been made with the camera 17 during conveyance of the tread 1 over the slit 46, the sides of the tread have been determined and from that the position of the middle of the tread 1 along the longitudinal direction 1 of the tread in plot I (the longitudinal axis of the tread). Above it in plot II the computer calculation is shown which calculates what the lateral movement of the conveying device has to be during applying the tread 1 on the building drum 20, for bringing the measured longitudinal axis in conformity with a target value. Here the position of the longitudinal axis can be moved as a whole, but also the course of the longitudinal axis.

Figures 7, 8:
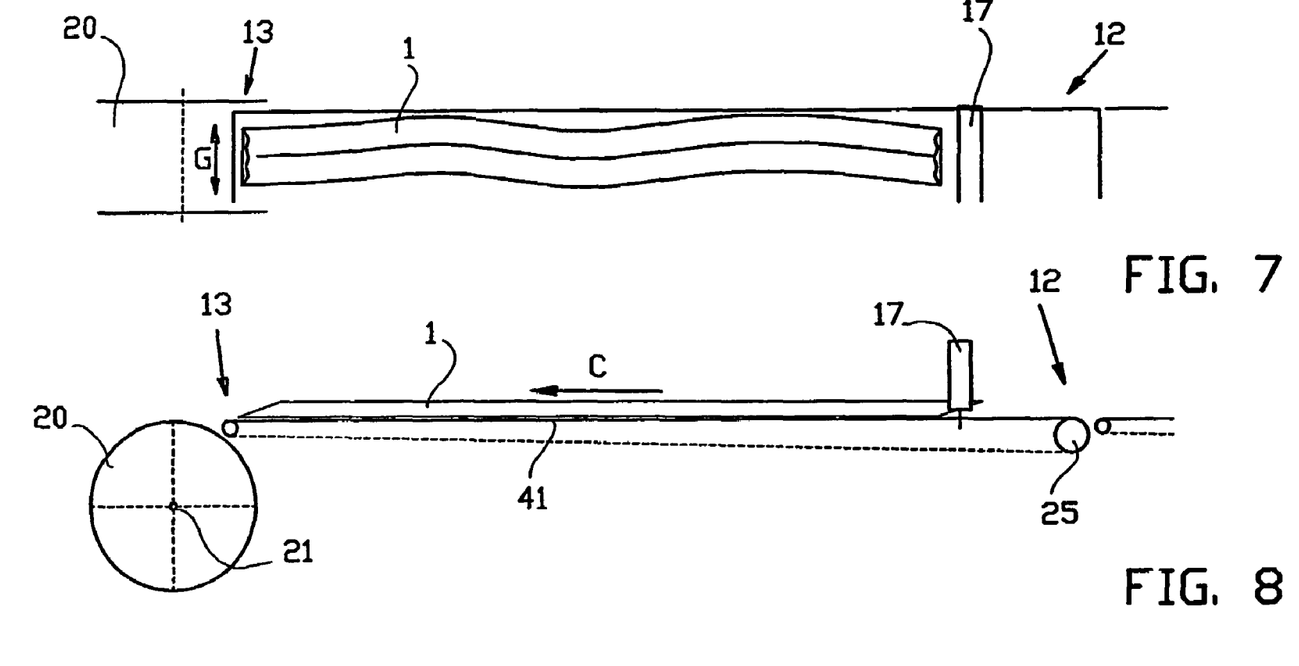
FIG. 7 shows a schematic view of deviations in a tread.
FIG. 8 shows a side view of FIG. 7.

FIG. 7, in a slightly exaggerated way, shows the deviations in the shape of the tread on the tread conveying device, wherein it can clearly be seen how various segments of the tread are not in line as a result of which the tread no longer forms a straight band but has several meanderings (the longitudinal axis is not straight). Due to lateral movement of the ends of the tread conveying device during applying the tread on the building drum 20 it is possible as stated above to eliminate these meanderings. The resulting longitudinal axis is a straight line.

FIG. 8 show a side view of FIG. 7 with again the most important parts of the tread application device clearly showing the building drum 20, a conveyor belt 41 and schematically the tread 1 and a measurement device 17, here provided with a camera.

It will be clear that the above description has only been included to illustrate the operation of preferred embodiments and not to limit the scope of protection of the present invention. The scope of protection of the present invention is defined by the claims stated below. Varieties and designs of the embodiments discussed in the above description that are evident to an expert also fall within the scope of protection of the present invention.

The invention claimed is:

1. Tread application system comprising:
   a building drum for building a tire, and driving means for driving the building drum, said building drum having an axis of rotation,
   a tread application device for applying a tread segment on the building drum, comprising:
   a tread conveying device for conveying the tread to the building drum, from a feed side of the tread conveying device to a discharge side of the tread conveying device in a conveyance direction, comprising a main conveyor belt extending from the feed side to the discharge side in the conveyance direction, and a first feed auxiliary conveyor belt and a second feed auxiliary conveyor belt on opposite sides of the main conveyor belt, and a first discharge auxiliary conveyor belt and a second discharge auxiliary conveyor belt, each feed auxiliary conveyor belt extending from the feed side in the conveyance direction, each discharge auxiliary conveyor belt extending in the conveyance direction towards the discharge side, the first feed auxiliary conveyor belt and the first discharge auxiliary conveyor belt extend in the conveyance direction in line with each other, are connected to each other by means of a toothed belt and are positioned at a short distance from each other for forming a first slit-shaped opening between the first feed auxiliary conveyor belt and the first discharge auxiliary conveyor belt, the second feed auxiliary conveyor belt and the second discharge auxiliary conveyor belt extend in the conveyance direction in line with each other, are connected to each other by means of a toothed belt and are positioned at a short distance from each other for forming a second slit-shaped opening between the second feed auxiliary conveyor belt and the second discharge auxiliary conveyor belt so that on both sides of the main conveyor belt a measuring slit is formed, wherein the main conveyor belt and both feed auxiliary conveyor belts share a common feed bearing roller and driving means, wherein the main conveyor belt and both discharge auxiliary conveyor belts share a common bearing roller, and driving means for the tread conveying device, and a positioning device for positioning the tread on the building drum, wherein the positioning device comprises measuring means above or below the measuring slit, said measuring means being positioned at the feed side for determining the position of a segment of the tread and generating data indicating a position value, displacement means for displacing the tread conveying device, said displacement means being adapted for displacing the segment of the tread with a displacement directional component parallel to the axis of rotation of the building drum, and a computer provided with a memory and software and connection means for receiving data from the measuring means and for transmitting orders and data to the driving means of the building drum, the driving means for the tread conveying device, and the displacement means for displacing the conveying device, said computer, on the basis of the position value, controlling the displacement means during the application of the segment of the tread on the building drum.

2. Device according to claim 1, wherein the tread conveying device is positioned mobile for displacing the discharge side with a directional component parallel to the axis of rotation of the building drum.

3. Device according to claim 2, wherein the tread conveying device is rotatably positioned about an axis of rotation substantially perpendicular to the displacement direction.

4. Device according to claim 3, wherein the tread conveying device is positioned with the axis of rotation near the feed side for rotating the tread conveying device substantially parallel to a tread to be applied.

5. Device according to claim 1, comprising means for securing a segment of a tread.

6. Device according to claim 1, further comprising further measuring means for determining the length of a tread.

7. Device according to claim 6, further comprising means for adapting the length of a tread based on the result of the difference between the length measured and a predetermined set length.

* * * * *